May 5, 1959 R. J. BAILER 2,884,732
ARTIFICIAL BAIT
Filed April 15, 1957

INVENTOR.
RAYMOND J. BAILER
BY
Robert G. Sloman
ATTORNEY

United States Patent Office 2,884,732
Patented May 5, 1959

2,884,732
ARTIFICIAL BAIT

Raymond J. Bailer, Richmond, Mich.

Application April 15, 1957, Serial No. 653,024

4 Claims. (Cl. 43—42.33)

This invention relates to an artificial fish bait or lure and more particularly to a lure of hollow construction with one or more windows therein and with a rotor within the body of the lure carrying various color strips adapted for selective registry with the window or windows.

It is another object herein to provide a hollow lure body with one or more windows therein and rotatively journaled within the body a rotor adapted to selectively display different colors in registry with the window or windows.

It is another object of the present invention to provide a novel means of removably securing a gang hook to an artificial bait.

Figure 2:
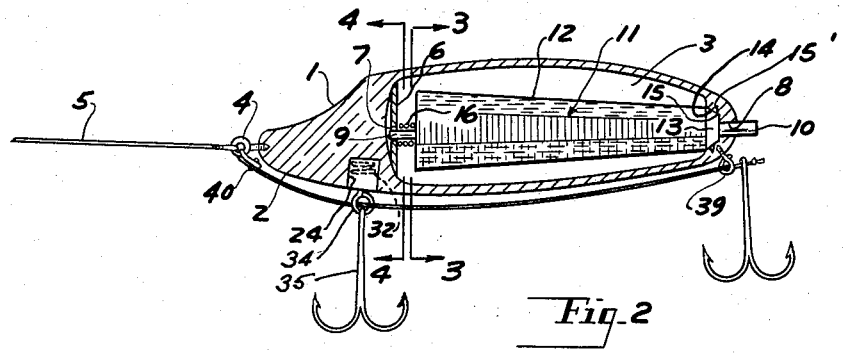
Figure 1:
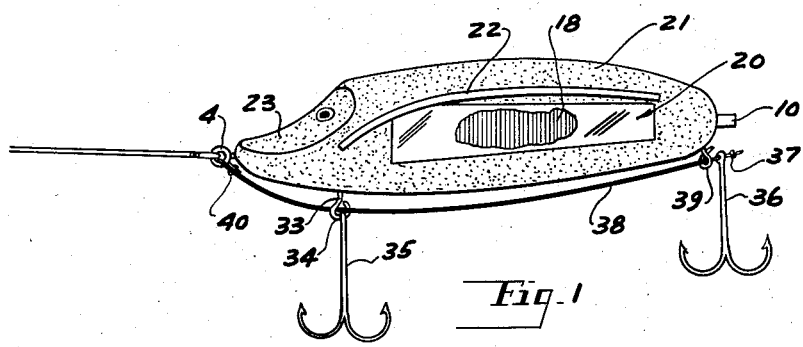
Figures 3, 5, 6:
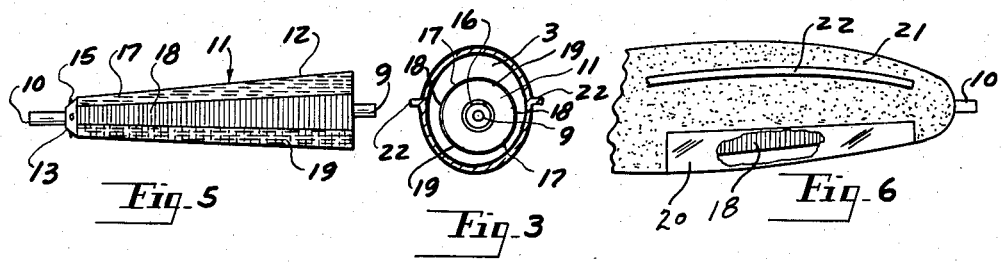
Figures 7, 8, 9, 10, 11:
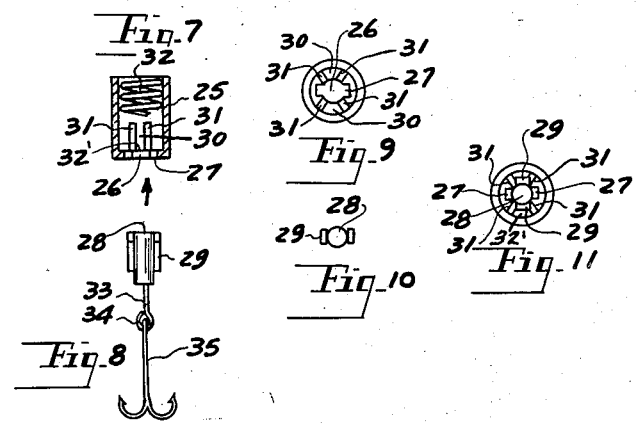
Figure 4:
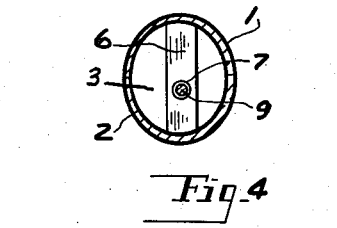

These and other objects will be seen from the following specification and claims in conjunction with the appended drawing in which:

Fig. 1 is a side elevational view of the present lure.
Fig. 2 is a longitudinal section thereof.
Fig. 3 is a section taken on line 3—3 of Fig. 2.
Fig. 4 is a section taken on line 4—4 of Fig. 2.
Fig. 5 is a side elevational view of the rotor shown in Fig. 2, illustrating the color strips.
Fig. 6 is a fragmentary side elevational view similar to Fig. 1 but showing the window adjacent the bottom of the lure body.
Fig. 7 is an elevational section on an enlarged scale of the bayonet socket construction for the removable gang hook.
Fig. 8 is a side elevational view of the gang hook mounting bayonet plug.
Fig. 9 is a plan view of the socket shown in Fig. 7.
Fig. 10 is a plan view of the plug shown in Fig. 8.
Fig. 11 is a plan view illustrating the locked position of the bayonet plug in the socket.

It will be understood that the above drawing illustrates merely a preferred embodiment of the invention and that other embodiments are contemplated within the scope of the claims hereinafter set forth.

The present artificial bait consists of a pair of oppositely arranged preferably molded interconnected plastic body halves 1 and 2 providing therebetween, elongated chamber 3. Eyelet 4 is secured in a conventional manner to the forward end of the lure body and is adapted to receive the conventional fishline 5 by which the lure is drawn through the water.

As shown in Figs. 2 and 4 there is provided a front bearing which consists of the upright plate 6 secured within said chamber towards its forward end to interior portions of the body. Plate 6 has a transverse aperture 7 completing the front bearing. Axial aperture 8 is defined between the registering body halves 1 and 2 at the rear end thereof providing the rear journal for the elongated rotor 11, which is loosely positioned within chamber 3.

Stud shaft 9, secured axially upon rotor 11, projects forwardly thereof and is journaled within aperture 7.

Coiled spring 16 is mounted upon shaft 9 and interposed in compression between plate 6 and the front wall of said rotor. A second axial stud shaft 10 projects from the rear end of rotor 11 and is journaled through the rear bearing 8.

The outer surface of rotor 11 in the preferred embodiment is tapered at 12; and at the rear end of said rotor there is an annular tapered end wall 13. A similarly tapered seat 14 is formed within the rear portion of body 1—2 upon its interior, co-axially of shaft 10. Tapered end wall 13 is adapted to cooperatively and retainingly nest within seat 14 under the action of spring 16, whereby said rotor is frictionally retained against rotation.

In order to further retain said rotor against rotation there are interlocking projections and recesses formed within the tapered end wall 13 and seat 14. In the preferred specific embodiment there are provided a series of radial projections 15 on the tapered end wall 13 which are adapted to selectively and cooperatively nest within corresponding apertures 15' formed within tapered seat 14.

Upon the exterior surface of rotor 11 there are provided a series of pairs of elongated color strips, as for example, strips 17, 18 and 19 respectively hatched to indicate the colors silver, red and gold. These colors are shown merely for illustration. In the selection of colors any desired arrangement may be employed. As shown in Fig. 3, there are a pair of opposed color strips 17, a pair of opposed color strips 18 and a third pair 19.

In the present preferred embodiment, the body 1—2 is preferably constructed of a transparent plastic material. Portions of the body are rendered opaque by applying either to the inner or outer surface thereof an opaque substance, such as paint, 21.

Portions of the transparent body remain transparent to thereby define elongated transparent areas or windows 20 on opposite sides of the body as in Fig. 1, or merely a single window upon the bottom of the body and adjacent lower side wall portions as in Fig. 6.

Color strips 17, 18 and 19 are so arranged in pairs that for any particular setting of rotor 11 a pair of color strips such as strips 18 on opposite sides of rotor 11 will register with the side windows 20 and be apparent therethrough to give the lure a characteristic color effect.

Stud shaft 10 at the rear end of rotor 11 projects through bearing 8 and rearwardly of the body providing a manual means for effecting rotary adjustment of said rotor; thus changing the color strips which will register with windows 20 to produce a different color effect.

In operation, the shaft 10 is initially projected longitudinally inward against the action of spring 16 in order to unseat the rotor end 13 and at the same time disconnect the interlocking projections 15 and recesses 15'. In the illustration in Fig. 2, the rotor is normally retained against accidental rotation. However, by projecting the rotor inwardly slightly the shaft 10 may be employed for manually adjusting the rotor to thus produce a different color effect for the particular lure.

By this construction various color effects may be produced in a single lure rendering the same much more valuable to the fisherman.

As shown in Figs. 1 and 3 there are formed a pair of laterally projecting curved and rearwardly trailing fins 22 for stabilizing the lure as it is drawn through the water. These fins also produce the desired irregular movement of the lure as it is drawn through the water, rendering it more attractive as a fish bait.

The forward end of the lure has a formed face portion 23 which is conventional.

The present invention contemplates the provision of a removable gang hook for the lure whereby said hook or hooks may be removed if desired for storage or for convenient carrying or for replacement. For this purpose there are provided one or more inwardly directed cylindrical recesses 24 within the lure body, preferably on the bottom portions thereof as shown in Fig. 2. Secured within said recess is a suitable bayonet type socket 25, shown in Fig. 7 on an enlarged scale, and which has an axial central opening 26 at the outer end thereof, normally flush of the exterior surface of the bait body.

A pair of slotted guide-ways 27 project from opposite sides of recess 26 receiving bayonet projections 29 on plug 28, Fig. 8. Said plug is projected upwardly from the relative position between Figs. 7 and 8 into opening 26 and guide slots 27 of socket 25.

Plug 28 is moved upwardly against the compression of coiled spring 32 within socket 25. After the bayonet projections 29 are moved sufficiently upward to have cleared members 31, the plug 28 is manually rotated 90 degrees, permitting the bayonet projections 29 to be lowered within the recess 30 defined by bayonet locking means 31. This position is illustrated fragmentarily in Fig. 11 with projections 29 resting on socket wall 32'.

In order to remove the gang hook from the body, the procedure is reversed. The plug 28 is lifted against spring 32 and rotated 90 degrees. The spring prevents the ganghook from accidental dislodgment from the body.

In the illustrative embodiment there is shown a second ganghook 36 adjacent the rear end of the lure secured at 37 upon the leader line 38. This line extends through the eye clip 39, mounted upon an end portion of the lure body, and extends forwardly through the eyelet 34 connecting the front ganghook 35 and is suitably secured to the front eyelet 4 by a conventional snap clip 40.

By this construction, if the fish is caught upon the rear hook 36, the main pressure will be transmitted through leader 38 to the forward end of the lure and to the fishline 5.

Having described my invention, I claim:

1. In an artificial bait, a hollow elongated opaque lure body, elongated transparent areas on opposite sides thereof defining a pair of elongated windows in said body, longitudinally spaced axial bearing means in said body, an elongated rotor loosely positioned within said body, a series of opposed pairs of elongated color strips arranged around said rotor, the respective pairs being of different colors, one pair of strips of one color registering with said windows, axial stud shafts at the ends of said rotor journaled through said bearing means and longitudinally adjustable thereon, a coiled spring mounted on one shaft interposed between one end of said rotor and one of said bearings under compression, normally urging the other end of said rotor into retaining frictional contact with said body, the other shaft projecting from said body providing means to manually adjust said rotor longitudinally and rotatively for registering a different pair of color strips with said windows.

2. In the bait of claim 1, an annular tapered seat in said body co-axial of and adjacent said other shaft, and a similarly tapered end wall on said rotor nested within said seat.

3. In the bait of claim 1, an annular tapered seat in said body co-axial of and adjacent said other shaft, a similarly tapered end wall on said rotor nested within said seat, and interlocking projections and recesses formed in said seat and tapered end wall normally retaining said rotor against rotation.

4. In an artificial bait, a hollow elongated opaque lure body, an elongated transparent area on the bottom and adjacent lower sides thereof defining an elongated window in said body, longitudinally spaced axial bearing means in said body, an elongated rotor loosely positioned within said body, a series of elongated color strips of different colors arranged around said rotor, one color strip registering with said window, axial stud shafts at the ends of said rotor journaled through said bearing means and longitudinally adjustable thereon, a coiled spring mounted on one shaft interposed between one end of said rotor and one of said bearings under compression, normally urging the other end of said rotor into frictional contact with said body, the other shaft projecting from said body providing means to manually adjust said rotor longitudinally and rotatively for registering a different color strip with said window.

References Cited in the file of this patent

UNITED STATES PATENTS

| | | |
|---|---|---|
| 1,272,812 | Keister | July 16, 1918 |
| 1,982,081 | Stage | Nov. 27, 1934 |
| 2,127,761 | Beck | Aug. 23, 1938 |
| 2,309,521 | Mabee | Jan. 26, 1943 |
| 2,593,792 | Reckler | Apr. 22, 1952 |
| 2,627,134 | Fitzgerald | Feb. 3, 1953 |
| 2,796,694 | Turner | June 25, 1957 |